United States Patent [19]

Abe et al.

[11] Patent Number: 4,942,461

[45] Date of Patent: Jul. 17, 1990

[54] DIGITAL MULTIPLE-COLOR IMAGE PROCESSING APPARATUS

[75] Inventors: Yoshinori Abe; Kazuo Watanabe; Tetsuo Kimoto; Tetsuo Hirata; Chiharu Kobayashi; Hideki Endo, all of Hachioji, Japan

[73] Assignee: Konica Corporation, Tokyo, Japan

[21] Appl. No.: 235,126

[22] Filed: Aug. 23, 1988

[30] Foreign Application Priority Data

| Aug. 24, 1987 | [JP] | Japan | 62-208174 |
| Sep. 30, 1987 | [JP] | Japan | 62-243655 |
| Sep. 30, 1987 | [JP] | Japan | 62-243656 |
| Sep. 30, 1987 | [JP] | Japan | 62-243657 |

[51] Int. Cl.$^5$ .................. H04N 1/46; H04N 1/40; G03F 3/08
[52] U.S. Cl. ........................ 358/75; 358/448; 358/450; 358/455; 358/465
[58] Field of Search ........... 358/75, 78, 80, 400, 358/448, 450, 455, 456, 465, 466

[56] References Cited

U.S. PATENT DOCUMENTS

| 4,674,861 | 6/1987 | Kawamura | 358/75 |
| 4,679,074 | 7/1987 | Sugiura et al. | 358/80 |
| 4,805,013 | 2/1989 | Dei et al. | 358/80 |
| 4,811,114 | 3/1989 | Yamamoto et al. | 358/75 |
| 4,866,533 | 9/1989 | Nagashima | 358/456 |

FOREIGN PATENT DOCUMENTS 58-220566 12/1983 Japan .................. 358/80

Primary Examiner—James J. Groody
Assistant Examiner—Randall S. Svihla
Attorney, Agent, or Firm—Finnegan, Henderson, Farabow, Garrett and Dunner

[57] ABSTRACT

An image processing apparatus includes a photoelectric converter, a multiple-value circuit, and a detachable external storage unit. The photoelectric converter photoelectrically coverts data of an original into image signals. The multiple-value circuit converts the image signals into multiple-valued data by comparing the image signals with predetermined threshold value data. The detachable external storage stores the threshold value data. The threshold values can also be made automatically responsive to gray scale data. The automatic mode and the manual selection mode are switched between in response to a release (toggle) signal. Color separation and color ghost correction are provided; and various types of formatting management are faciliated. Partial color converting (as, for example, color reversal) is also provided.

11 Claims, 4 Drawing Sheets

DIGITAL MULTIPLE-COLOR IMAGE PROCESSING APPARATUS

BACKGROUND OF THE INVENTION

1. Field of the Invention

The present invention relates to an image processing apparatus for reading original image data and digitally processing it.

2. Description of the Prior Art

In an image processing apparatus of this type, an original image is converted into an electrical signal by photoelectric conversion. Then, the electrical signal is simultaneously subjected to A/D conversion and shading correction. Upon predetermined processing, the signal is converted into multiple-valued data, e.g., binary data to be used for display or recording. Threshold value data used in this multiple-value conversion is stored in a ROM or the like in the image processing circuit.

In a color image processing apparatus, color image data is read and converted into a plurality of color signals. The color signals are simultaneously subjected to A/D conversion and shading correction. Upon color separation, each color signal is converted into a color signal having a plurality of bits. Then, these signals are subjected to predetermined processing, and converted into multiple-valued data, e.g., binary data to be used for display or recording. A table for the color separation processing described above is stored in a ROM in the image processing apparatus in advance.

However, since each ROM for storing the above-described threshold data or color table is fixed on an internal processing circuit board, when threshold values need be changed or different color separation is required, a corresponding ROM must be replaced with another one.

In order to replace the ROM on the board with another ROM, a housing of the apparatus must be disassembled. For this reason, this replacement operation is limited to a serviceman. Therefore, a user cannot quickly obtain an image with a desired tone or color separation.

A system may be considered, wherein different threshold data or color separation tables are stored in a plurality of ROMs, and one of the ROMs is selected by a switching operation in an operation section. In this case, however, a large ROM capacity (quantity) is required, and it is impossible to include all the data necessary for all the users.

According to the above-described image processing apparatus, a high-speed ROM (e.g., a bipolar ROM) is used to store the threshold value data or the color separation table. Since such a high-speed ROM has a capacity of about 8 Kb, it cannot store a large pattern. Furthermore, since such a ROM has high power consumption, and heat is generated, a countermeasure for solving such a problem is required.

In addition, this image processing apparatus only reads data of an original, applies predetermined processing (edge emphasis, trimming, partial/overall color conversion, and the like) to the data, and directly displays or stores the data. Therefore, when a specific format such as a confidential mark, a graph, or a ruled line need be added to an original, the data of the original must be written on an original with a corresponding format, or the graph or the ruled line must be written (stamped) on the original. For this reason, a plurality of formats must be prepared and managed.

SUMMARY OF THE INVENTION

The present invention has made in consideration of the above situation, and has as its first object to provide an image processing apparatus wherein threshold value data can be easily changed so as to allow a user to arbitrarily obtain a desired image without increasing its internal ROM capacity.

It is a second object of the present invention to provide an image processing apparatus wherein a color separation table can be easily changed so as to allow a user to arbitrarily perform desired color separation without increasing its internal ROM capacity.

It is still another object of the present invention to provide an image processing apparatus wherein a large, desired, arbitrary table can be stored as a color separation table or threshold value data, the table can be easily replaced with another table, and moreover, no specific countermeasure to generation of heat is required.

It is still another object of the present invention to provide an image processing apparatus wherein even if a plurality of formats such as a ruled line format are required, management thereof is facilitated, and ruled stationery or the like need not be prepared in every copying operation.

DETAILED DESCRIPTION OF THE PREFERRED EMBODIMENT

Figure 1:
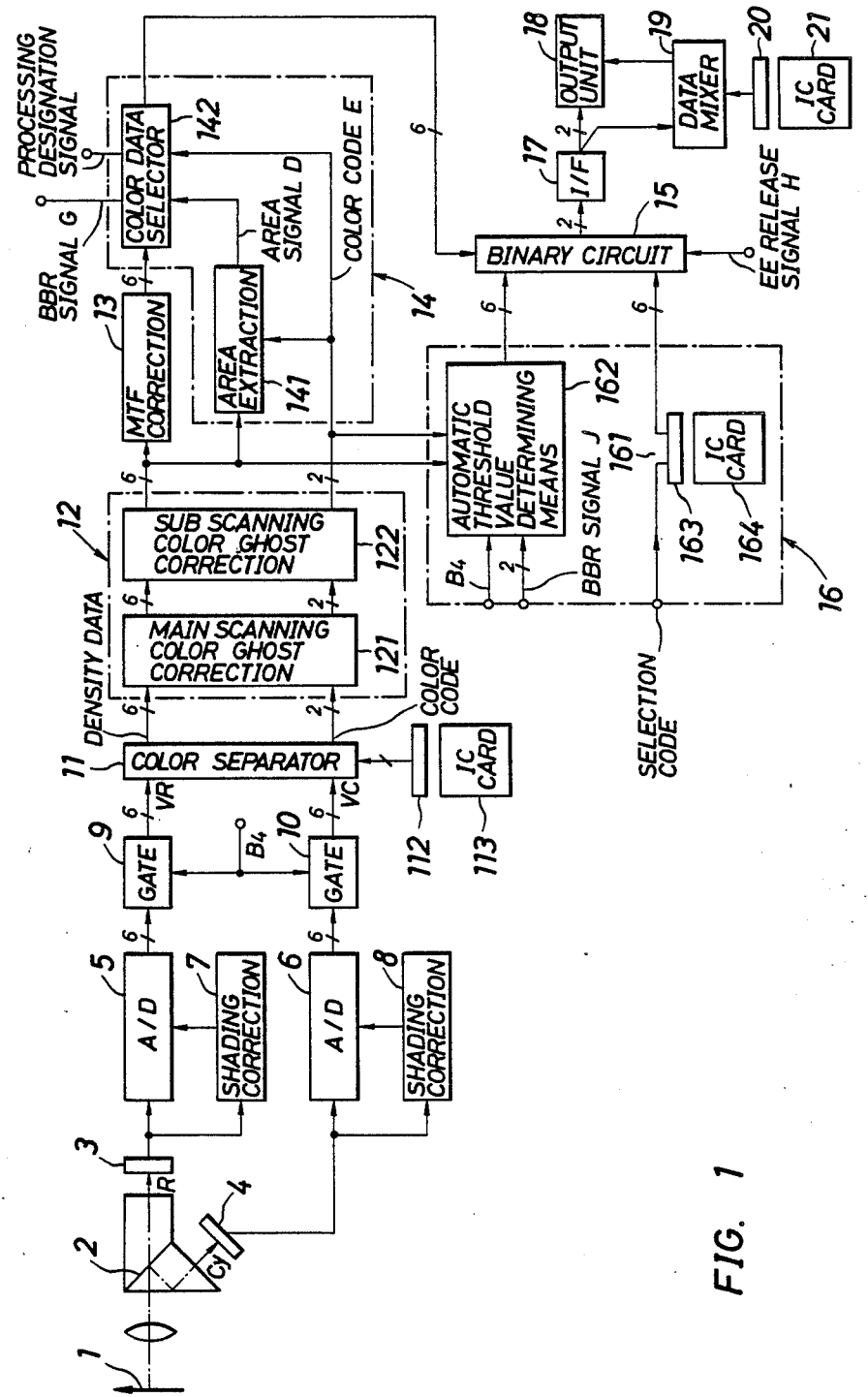
FIG. 1 is a schematic block diagram showing an overall circuit arrangement of a color image processing apparatus as an image processing apparatus according to an embodiment of the present invention.

An image processing apparatus according to an embodiment of the present invention will be described below. FIG. 1 shows a schematic arrangement of an overall color image processing apparatus according to the embodiment of the present invention. Color image data (optical data) of a color original 1 is separated by a dichroic mirror 2 into two color-separated images. In this embodiment, the data is separated into a red (R) color-separated image and a cyan (Cy) color-separated image. For this purpose, the dichroic mirror 2 has a cutoff wavelength of about 540 to 600 nm. In this case, red and cyan components become transmitted and reflected light, respectively.

The red (R) and cyan (Cy) color-separated images are respectively incident on image sensors 3 and 4 such as CCDs, and then image signals which are respectively constituted by only red (R) and cyan (Cy) components are output.

The image signals R and Cy are supplied to A/D converters 5 and 6 to be converted into digital image signals each having a predetermined number of bits (in this embodiment, 6 bits). In this case, shading correction is performed simultaneously with A/D conversion. Reference numerals 7 and 8 denote circuits for shading correction. Each shading correction is performed by changing the reference voltage of a corresponding A/D converter.

Gates 9 and 10 extract only signal components corresponding a maximum original size width from the digital image signals upon shading correction, and supply them to a color separator 11 of the next stage. When the maximum original size is a B4 size, size signals B4 generated by a timing signal generating means (not shown) in the system are used as gate signals for gates 9 and 10.

In this case, assuming that the shading-corrected digital signals are VR and VC, respectively, then these image signals VR and VC are supplied to the color separator 11 to be separated into a plurality of color signals. In this case, they are separated into three color signals i.e., red, blue, and black signals. Each separated color signal consists of color code data (two-bit data) representing its color data and gray scale data (six-bit data).

The color-separated image data are supplied to a color ghost correcting means 12 so that color ghosts in a main scanning direction (a horizontal scanning direction) and a subscanning direction (a rotating direction of a drum of an output unit) are corrected. Reference numerals 121 and 122 denote color ghost correcting circuits in the main scanning and subscanning directions, respectively.

Color ghost correction is performed because unnecessary color ghosts are generated especially around a black portion in a color separation period. Red or blue appears around a black character at its edge portions depending on the arrangement of a color separation map. Image quality can be improved by eliminating color ghosts. Note that only color code data is subjected to color ghost correction.

Reference numeral 13 denotes an MTF correcting means. Since MTF correction is edge correction, target image data to be processed is gray scale data.

Reference numeral 14 denotes a partial color converting means, which is constituted by an area extractor 141 for detecting an image area marked on an original or the like by a color marker and a color data selector 142 for copying the extracted area with a designated color. Areas other than a designated area can be recorded with a designated color.

A signal D (area signal) representing the area surrounded by the color marker is output from the area extractor 141, and is supplied to the color data selector 142 together with color code data E.

The color data selector 142 yields a processing designation signal F for designating a type of image processing and a BBR signal G representing a color to be currently formed and output from a display/operation section (operation panel section), and determines whether gray scale data MTF-corrected by the signals F and G, and the above-described input signals D and E is supplied to a binary circuit 15 serving as a multiple-value means of the next stage.

For example, when copying is simply performed, only image data having the same color data as that of the BBR signal G is output. When color conversion of an overall original is to be performed, e.g., blue is converted into red, and red into blue, color conversion is controlled such that red image data is output when blue is recorded, and blue image data is output when red is recorded.

When partial color conversion is to be performed, black data in an area surrounded by a color marker can be recorded with the color of this marker. For example, if black data in an area surrounded by a red marker is output at a phase of red recording, the color of the area can be converted and recorded.

Such partial color conversion and color designation can be performed by only employing a developing system wherein when colors are developed, a drum is rotated for each color development, and fixing is performed only when development of a last color is completed.

In this case, an imaging operation is performed a plurality of times. Image recording can be performed in a real time manner by performing imaging and developing operations a plurality of times. With this real-time processing, a memory for storing images can be omitted.

The image data (gray scale data) output from the color data selector 142 is binarized by the binary circuit 15 serving as the multiple-value means. In this embodiment, six-bit gray scale data is converted into one-bit data (binary data) represented by 1 or 0. Threshold value data (six bits) serving as a reference value for binarization is manually or automatically set.

A threshold value selecting means 16 for this operation comprises a manual threshold value determining means 161 for allowing a user to set a desired threshold value and an automatic (EE) threshold value determining means 162 for setting a threshold value in accordance with gray scale data, via the 6-bit gray scale signal line which is also applied to the MTF correction circuit 13. The manual and automatic operations are switched by an EE release signal H. An automatic setting mode (EE mode) is normally set. In addition, the automatic threshold value determining means 162 receives a BBR signal J representing a sequence of development processing of a developing unit.

In this embodiment, the manual threshold value determining means 161 is designed such that an IC card 164 serving as an external storage device for storing threshold value data in advance is detachably inserted in a connector 163. With this arrangement, a desired threshold value can be set by supplying a selection code K from the operation panel to the threshold value determining means 161. Data of a large number of dots for halftone or various gray scale levels are used as such threshold value data.

The image data binarized by the binary circuit 15 is supplied to an output unit 18 through an interface circuit 17 for recording/display.

A laser recording unit is used as the output unit 18. In this case, the binary image is converted into a predetermined optical signal which is, in turn, modulated on the basis of the binary data.

An electrophotographic color copying machine is used as a developing unit for developing a latent image formed by the laser recording unit. For example, a two-component noncontact jumping development method with reversal development is employed. In order to realize a small-size apparatus, a tricolor image consisting of blue, red, and black is developed on an image forming OPC photosensitive element (drum) by rotating the drum three times, and then the developed image is transferred onto recording paper such as normal paper by one transfer operation upon development.

Data mixer 19 branched from the output side of the interface circuit 17 is connected thereto. Composite data obtained by mixing different data using the data mixer 19 is input to the output unit 18. The output unit 18 selects either data directly supplied from the interface circuit 17 or the composite data.

A connector 20 is connected to the data mixer 19 to receive another data. An IC card 21 for prestoring format data of a confidential mark format, a graph format, a ruled line format, and the like can be detachably connected to the connector 20.

With this arrangement, desired format data in this IC card 21 is selectively read out by the data mixer 19, or the IC card 21 is replaced with another IC card for storing different format data and the data is read out, thereby supplying desired format data to the data mixer 19.

As described above, the original data or the data obtained by formatting the initial data using the data mixer 19 can be input to the output unit 18. In addition, when the initial data is not output from the interface circuit 17, only simple format data can be input to the output unit 18.

The user can, therefore, easily and arbitrarily format original data by selecting format data in an IC card or replacing IC cards. In addition, since obtained format data is directly input without going through an image reading means, a format can be obtained without degrading an image.

The schematic arrangement of the color image processing apparatus has been described so far. Color separation will be described further in detail below.

An IC card serving as an external storage unit for storing a plurality of types of color separation map data is detachably connected to the color separator 11 through a connector 112.

Each color separation map data is stored as color code (designating red, blue, or black) and gray scale data at an address provided by 6-bit image data VR and VC each having a halftone level. More specifically, one image data=color code+gray scale data For example, a pixel having the 30th gray scale level (XX011110) can be represented by hexadecimal notation as follows:

$$\text{red} = \underset{\substack{\text{(color} \\ \text{code)}}}{10} \, \underset{\substack{\text{(gray} \\ \text{scale} \\ \text{data)}}}{011110} = 9E$$

Similarly, blue=01011110=5E black=00011110=1E white=11011110=DE

White can be represented by either DE or C0.

Figure 2:
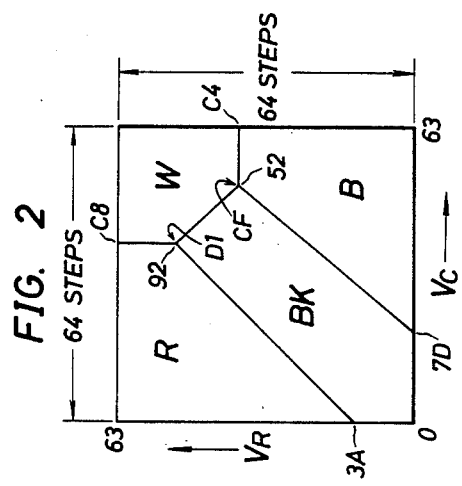

Such data is stored in a semiconductor memory in the IC card 113 at a corresponding address in the manner as shown in FIG. 2. In this case, since only four colors, i.e., red, blue, black, and white are selected, the color code has two bits. However, the number of bits may be increased with an increase in the number of colors. In addition, the gray scale data has six bits in this case. If, however, only characters are processed, four bits are sufficient in practice. The number of bits may be changed in accordance with a target image.

Figure 3C:
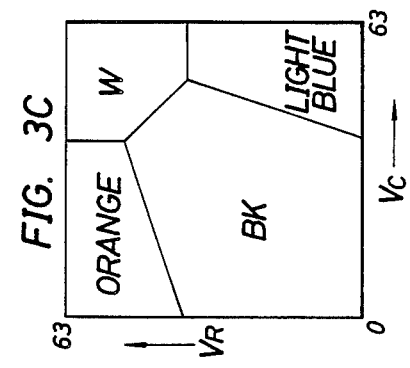
FIGS. 2, 3A, 3B, and 3C show color separation maps.
Figure 3B:
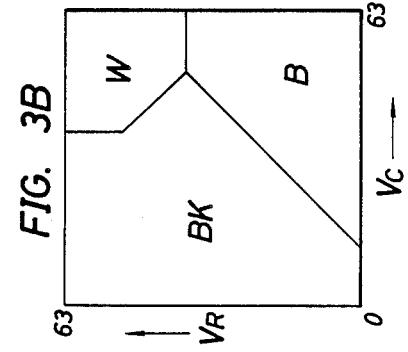
Figure 3A:
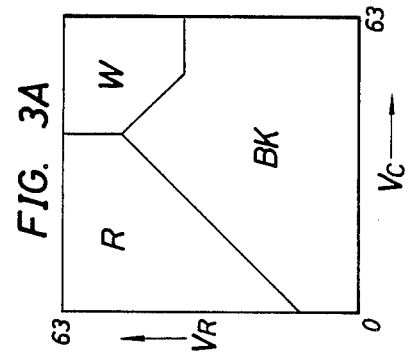

On the other hand, in practice, a specific color or a color other than red, blue, and black may be required to be extracted. In such a case, other IC cards different from that in the embodiment are prepared, and a color separation map is selected from a plurality of IC cards as needed. FIGS. 3A and 3B show maps for three colors. FIG. 3C shows a map for four colors.

Figure 4:
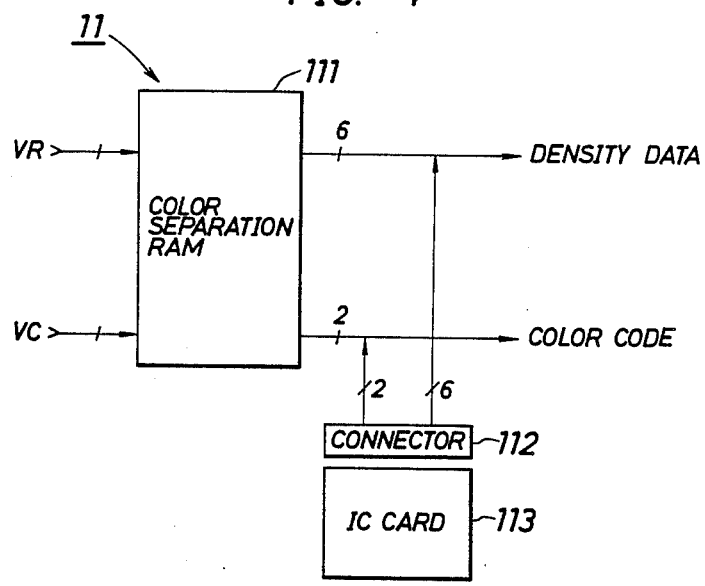
FIG. 4 is a block diagram showing a circuit arrangement of a color separator.

FIG. 4 shows part of the color separator 11 in detail. A color separation map table is stored in a high-speed color separation RAM 111 (if the drive frequency of a CCD serving as an image reading element is about 10 MHz at most, a RAM having an access time of 10 nsec is used). Color separation is performed by utilizing this map. Data writing in RAM 111 is performed such that the IC card 113 is connected to the RAM 111 through the connector 112, and data in this IC card 113 is transferred. With this arrangement, if a plurality of IC cards 113 are prepared, and the data of the map tables shown in FIGS. 3A, 3B, and 3C are stored therein in advance, the user connects one of the IC cards 113, in which a desired color separation map table is stored, to the connected 112, and can write the map table in the color separation RAM 111, thereby performing desired color separation processing.

Figure 5:
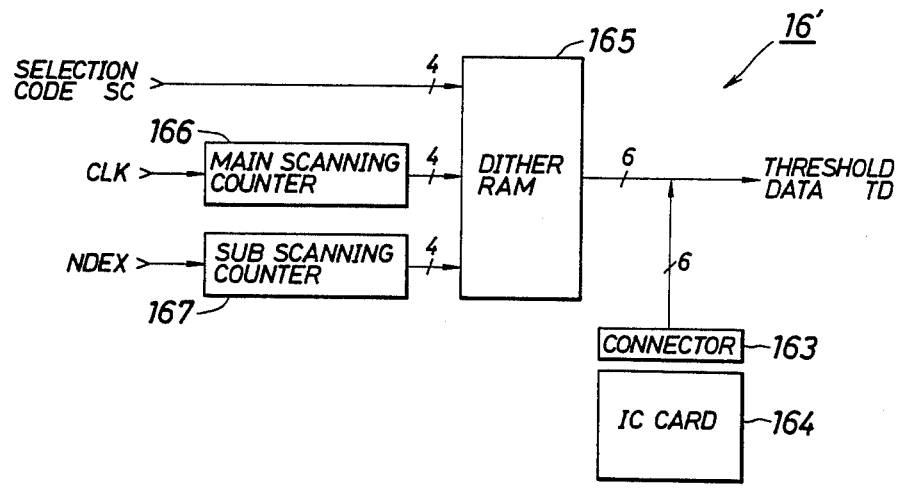
FIG. 5 is a block diagram showing a circuit arrangement of a threshold value data circuit for binarization.

FIG. 5 shows a detailed arrangement of a threshold value data circuit which can be used in place of the threshold value selecting means 16 in FIG. 1.

A data storage section of the threshold value data circuit 16 is constituted by a dither RAM 165. Specific pattern data in the RAM 165 is designated by a selection code SC, read out by main scanning and subscanning counters 166 and 167, and then is transferred to the binary circuit 15 as threshold value data TD. Data writing in the dither RAM 165 is performed such that an IC card 164 is connected to the RAM 165 through a connector 163, and data in this IC card 164 is transferred. With this arrangement, if a plurality of IC cards 164 are prepared and a plurality of different dither patterns are written therein in advance, an arbitrary dither pattern can be written in the dither RAM 165 by replacing the IC cards 164.

Figure 6:
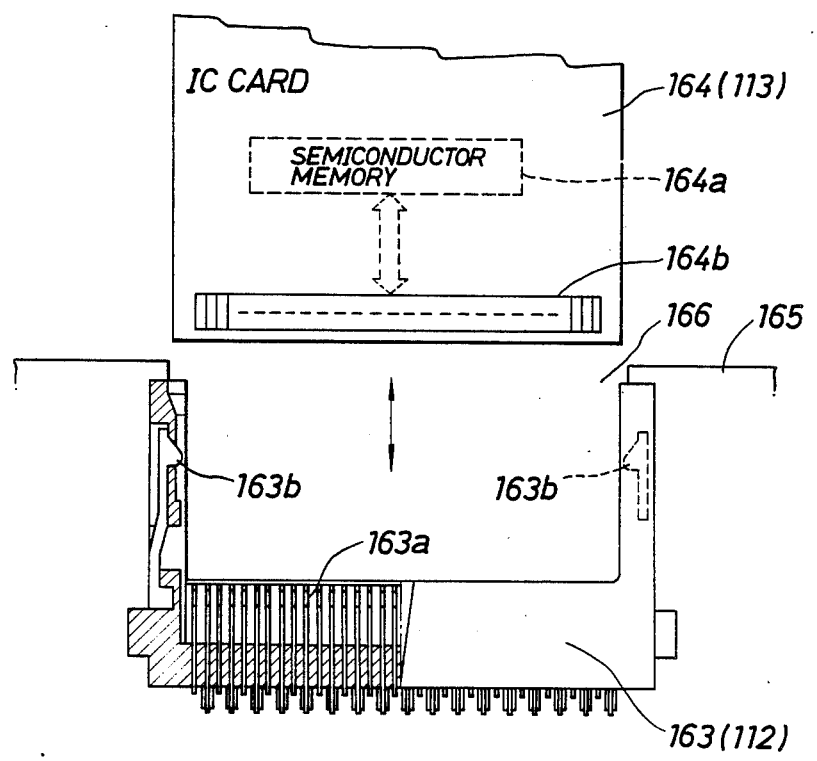
FIG. 6 is a view illustrating a relationship between an IC card and a connector.

FIG. 6 shows a relationship in coupling between the connector 163 (or 112) and the IC card 164 (or 113). In this case, only the connector 163 and the IC card 164 will be described. Reference numeral 165 denotes an image processing apparatus body; and 166, an IC card mounting portion arranged in the body 165. The connector is attached to the mounting portion 166.

The size of the IC card 164 substantially corresponds to that of a name card. The IC card 164 comprises a semiconductor memory 164a and an input/output terminal array as a means for accessing the memory 164a. The input/output terminal array 164b is housed in a case made of thin plate members.

As the semiconductor memory 164a, a mask ROM, an EPROM, an EEPROM, a one-time ROM (OTPROM), a nonvolatile memory (NOVRAM), or a battery backup RAM is used. In addition, a CPU or a logic circuit may be employed. A plurality of functions of the above devices may be arbitrarily combined. When the backup RAM is used, it is preferable that the apparatus is designed so as to allow a battery to be attached/detached and incorporate, e.g., a capacitor having a large capacitance for maintaining storage contents when the battery is replaced with another one. When a rewritable element is used as the memory 164a, a write preventive means is preferably arranged to prevent erroneous writing and erasing. The preventive means can be realized such that a switch is arranged on the IC card, and a write permission signal line of the memory is controlled by this switch. This permission signal line may be externally controlled through a contact.

It is preferable that the input/output terminal array 164a has a proper shutter mechanism so as to be free from the influences of contamination or static electricity. According to this arrangement, the shutter is opened when the IC card 164 is inserted into the IC card mounting portion 166 so that the terminal array 164a is connected to the connector 163, and is closed when the IC card 164 is pulled off. In addition, in order to prevent destruction of the IC card 164 or the body 165 caused when the IC card 164 is reversely inserted into the mounting section 166, a proper reverse insertion preventive mechanism is preferably arranged. This mechanism can be realized by forming the shapes of the right and left halves of the connector to be asymmetrical. A means for accessing this semiconductor memory 164a can be arranged by magnetic coupling or optical coupling other than electrical coupling using a contact.

The connector 163 of the IC card mounting portion 166 comprises a terminal array 163a to which the terminal array 164b of the IC card 164 is connected, and a hold member 163b for elastically holding the inserted IC card 164. The above-described asymmetrical portions for reverse insertion prevention may be arranged on this connector 163.

The IC card used in the above case stores processing reference data. As such data, parameters for MTT correction and the like may be used and arranged in the same manner as the above data.

Instead of the processing reference data, an IC card in which image data is written may be used. In this case, a connector to be coupled to an image signal line, especially to a gray scale data line is provided, e.g., just as automatic threshold value determining means 162 of FIG. 1 receives the 6-bit gray scale image signal which is also applied to MTF correction circuit 13, and the IC card in which the image data is written may be connected to the connector.

For example, if an IC card in which data of a format (special marks such as a confidential mark, ruled lines, graphs, or the like) is written in advance can be connected to the connector, image data optically read from an original can be mixed with the format image data from the IC card, thereby obtaining a formatted image. In addition, if document data formed by a word processor is written in this IC card, the image of the document can be output. In this case, quality of the image is higher than that of an image obtained by optically reading and processing an original printed out by the word processor. If a data base containing patent data and the like is prepared in a plurality of IC cards, the contents of the IC cards can be displayed and recorded upon mounting of the IC cards.

In the above case, the image data is transferred from the IC card into the image processing apparatus. In contrast to this, image data formed in the image processing apparatus can be written and stored in an IC card. In this case, for example, data prior to processing in the binary circuit 15 may be written in the IC card through the connector.

In the above embodiment, the IC card is functioned as a memory card. However, if this card comprises a CPU and operation keys or a display portion, processing reference data or image data can be set/changed by only this card, and moreover, its operation state can be confirmed through the display section.

In the above embodiment, the IC card 113 for a color separation map table and the IC card 164 for threshold data are independently arranged. If, however, they are integrated into a common IC card, and both the data are written in the common IC card, the number of IC cards to be managed is decreased.

What is claimed is:

1. An image processing apparatus comprising:
   photoelectric converting means for photoelectrically converting data of an original into an image signal;
   multiple-value means for converting the image signal into multiple-valued data by comparing the image signal with predetermined threshold value data; and
   detachable external storage means for storing the threshold value data.

2. An apparatus according to claim 1, wherein said external storage means is a card incorporating a semiconductor memory, and when said card is mounted in a predetermined portion of said image processing apparatus, said card is coupled to said multiple-value means and the threshold value data is read out from the memory.

3. An apparatus according to claim 1, wherein said multiple-value means comprises automatic threshold value determining means for determining threshold value data in accordance with the gradation of the original data.

4. An image processing apparatus comprising:
   converting means for separating a color image data into plurality of color-separated images and converting the color-separated images into a plurality of color signals;
   correcting means for obtaining distortion-corrected digital color signals from the plurality of color signals;
   color-separating means for separating the digital color signals into color signals each having a plurality of bits by using color separation data; and
   detachable external storage means for storing a color separation table containing the color separation data.

5. An apparatus according to claim 4, wherein said external storage means is a card incorporating a semiconductor memory, and when said card is mounted in a predetermined portion of said image processing apparatus, said card is coupled to said color separation table and the color separation data is read out from the memory.

6. An image processing apparatus comprising:
   converting means for separating a color image into a plurality of color-separated images and converting the color-separated images into a plurality of color signals;
   correcting means for obtaining distortion-corrected digital color signals from the plurality of color signals;
   color-separating means for separating the digital color signals into color signals each having a plurality of bits using color separation data; and
   multiple-value means for converting the color-separating color signals into multiple-valued data by comparing the color-separated color signal with threshold value data including predetermined threshold value data,
   wherein said color-separating means and said multiple-value means include RAMs, and said multiple-value means further includes means for determining said threshold value data in response to gray scale data of at least one of said images, or in response to a manual selection signal.

7. An apparatus according to claim 6, further comprising respective detachable external storage means for storing the threshold value data and the color separation data.

8. An apparatus according to claim 7, wherein each of said external storage means transfers data to a respective one of said RAMs.

9. An apparatus according to claim 7, wherein each of said external storage means is a card incorporating a semiconductor memory, and wherein said cards are mounted in respective predetermined portions of said image processing apparatus, said cards are respectively coupled to said multiple-value means and said color separation means and the threshold value data and the color separation data are read out from the memories.

10. An image processing apparatus comprising:
photoelectric converting means for photoelectrically converting data of an original into an image signal and outputting the image signal;
multiple-value means for converting the image signal into multiple-valued data by comparing the image signal with predetermined threshold value data;
data mixing means for mixing predetermined format data with the multiple-valued data converted by said multiple-value means; and
detachable external storage means for storing the format data.

11. An apparatus according to claim 10, wherein said external storage means is a card incorporating a semiconductor memory, and when said card is mounted in a predetermined portion of said image processing apparatus, said card is coupled to said data mixing means and the format data is read out from the memory.

* * * * *